United States Patent
Chang et al.

(10) Patent No.: US 9,575,889 B2
(45) Date of Patent: Feb. 21, 2017

(54) MEMORY SERVER

(75) Inventors: Jichuan Chang, Mountain View, CA (US); Parthasarathy Ranganathan, Fremont, CA (US); Kevin T. Lim, Ann Arbor, MI (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 1514 days.

(21) Appl. No.: 12/993,926

(22) PCT Filed: Jul. 3, 2008

(86) PCT No.: PCT/US2008/069168
§ 371 (c)(1),
(2), (4) Date: Nov. 22, 2010

(87) PCT Pub. No.: WO2010/002411
PCT Pub. Date: Jan. 7, 2010

(65) Prior Publication Data
US 2011/0072204 A1    Mar. 24, 2011

(51) Int. Cl.
G06F 12/02    (2006.01)
G06F 12/10    (2016.01)

(52) U.S. Cl.
CPC ....... G06F 12/0284 (2013.01); G06F 12/1009 (2013.01); G06F 2212/657 (2013.01); Y02B 60/1225 (2013.01)

(58) Field of Classification Search
CPC .............. G06F 12/0284; G06F 12/1009; G06F 2212/657; Y02B 60/1225
USPC ................ 711/117, 119, 120, 147–149, 173, 711/219–220
See application file for complete search history.

(56) References Cited

U.S. PATENT DOCUMENTS

| | | | |
|---|---|---|---|
| 5,765,181 A | 6/1998 | Oberlin et al. | |
| 6,199,141 B1 | 3/2001 | Weinreb et al. | |
| 7,043,623 B2 * | 5/2006 | Chen et al. | 711/219 |
| 7,480,773 B1 * | 1/2009 | Reed | 711/153 |
| 2010/0161929 A1 * | 6/2010 | Nation et al. | 711/170 |

FOREIGN PATENT DOCUMENTS

| | | |
|---|---|---|
| CN | 1118959 | 3/1996 |
| CN | 101001260 | 7/2007 |
| KR | 10-2006-0015324 | 2/2006 |
| KR | 10-2007-0071849 | 4/2007 |

OTHER PUBLICATIONS

International Search Report and Written Opinion for PCT/US2008/069168, Feb. 27, 2009.

* cited by examiner

*Primary Examiner* — Zhou Li
(74) *Attorney, Agent, or Firm* — Mannava & Kang, P.C.

(57) ABSTRACT

A memory server providing remote memory for servers independent from the memory server. The memory server includes memory modules and a page table. A memory controller for the memory server allocates memory in the memory modules for each of the servers and manages remote memory accesses for the servers. The page table includes entries identifying the memory module and locations in the memory module storing data for the servers.

2 Claims, 2 Drawing Sheets

MEMORY SERVER

CLAIM FOR PRIORITY

The present application is a national stage filing under 35 U.S.C 371 of PCT application number PCT/US2008/069168, having an international filing date of Jul. 3, 2008, which is incorporated by reference in its entirety.

BACKGROUND

Every server relies on physical memory, such as dynamic random access memory (DRAM), for processing. In addition to processors, physical memory is one of the most performance-critical resources for modern servers, and also constitutes a significant portion of the total server hardware costs.

Currently, memory modules are collocated with processors on a system board in a server. Nowadays, there are more and more processors, e.g., multi-core chips, provided on each system board. This requires even more memory to accommodate the processing needs of the increased number of processors. However, the requirement for more memory increases costs and size requirements. Furthermore, costs associated with sub-systems, such as power and cooling systems, increase due to the requirement for more memory on each system board. For businesses or other entities requiring many servers, this can represent a significant cost increase. Memory sharing schemes have been proposed, such as sharing memory among multiple processors and other schemes. However, these schemes tend to be difficult and costly to implement or require significant changes to commodity servers, operating systems and memory controllers.

BRIEF DESCRIPTION OF DRAWINGS

The embodiments of the invention will be described in detail in the following description with reference to the following figures.

DETAILED DESCRIPTION OF EMBODIMENTS

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

According to an embodiment, a memory-only server, referred to as a memory server, encapsulates an array of commodity memory modules and can be accessed by conventional servers via a shared backplane, such as a Peripheral Component Interconnect Express (PCIe) backplane or cable link. The memory server provides a pool of memory that can be shared by multiple different servers. Each of the servers may be independent. For example, each may have its own software stack comprised of an OS and applications and/or be on a separate system board.

The conventional servers that share the memory server, also referred to herein as compute servers, typically each include hardware, such as one or more central processing units (CPUs) or cores and memory modules on one system board. Unlike conventional servers, the memory server does not have to include CPUs. The memory server may be provided in a blade server form factor or may be provided in other server form factors, such as servers having larger housings. The memory server, regardless of the form factor, does not include memory and CPUs on the same system board. The memory server and compute servers may be housed in one enclosure, such as a data center rack or other enclosure and communicate over a connection, which may include a PCIe backplane.

Compared with prior approaches that collocate CPUs with memory resources, the memory server enables independent provisioning and servicing of compute and the memory server. Furthermore, having a large pool of memory resources in one blade enclosure and shared by multiple compute servers enables global power, reliability and capacity management that are not feasible in conventional processor/memory servers. The memory server provides benefits among the following: (1) allowing flexible, demand-driven DRAM provisioning, (2) enabling ultra-compact server form factor, and (3) global optimization of DRAM resources shared across servers. Furthermore, the memory in the memory server may be slower, cheaper, and less dense than conventional server memory, resulting in cost savings. Note that the memory server is especially beneficially when optical interconnects are used for networking between the memory server and other servers and computer systems.

Figure 1:
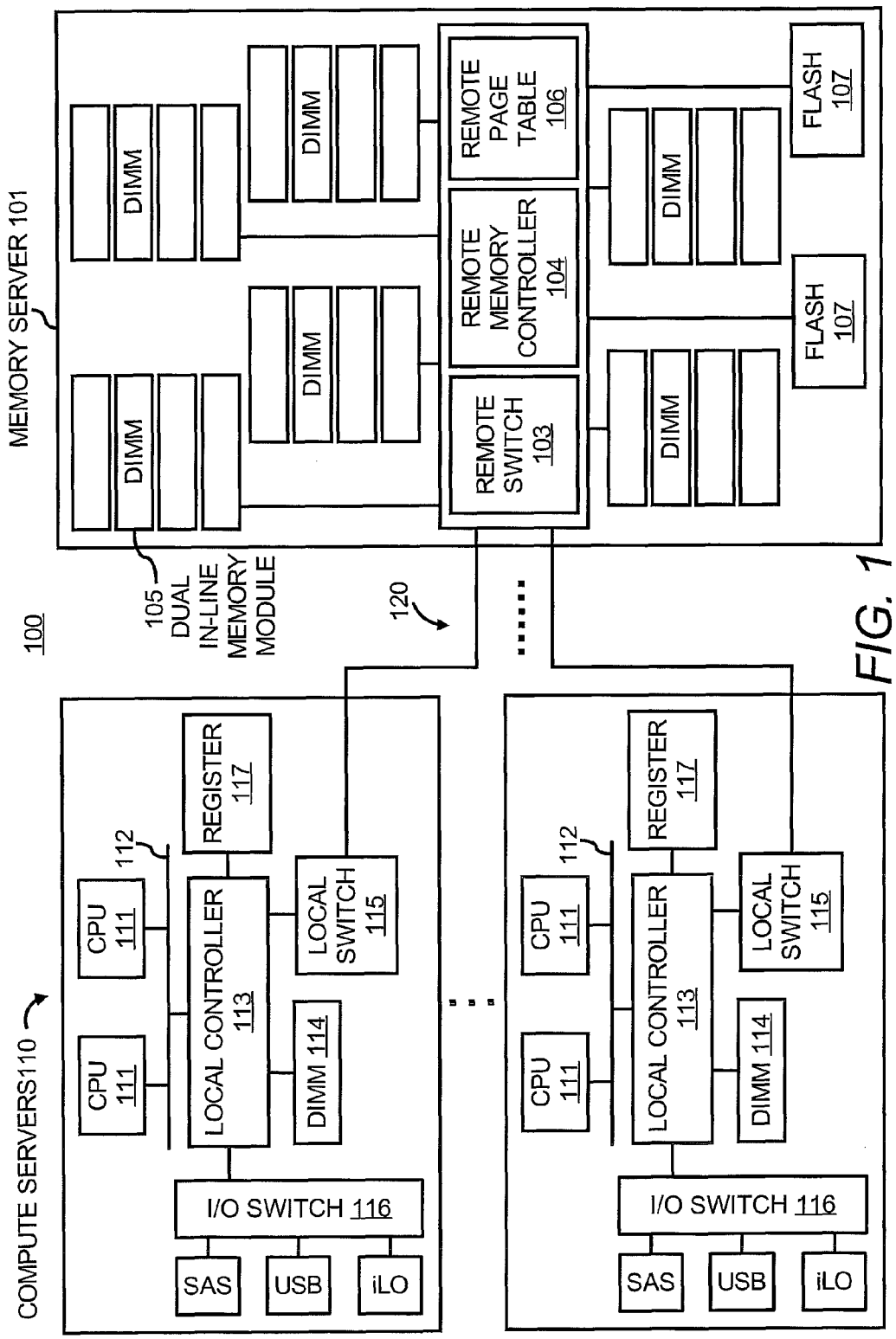
FIG. 1 illustrates a system, according to an embodiment.

FIG. 1 illustrates a system 100 according to an embodiment including multiple compute servers 110, a memory server 101 and a connection 120 connecting the compute servers 110 and the memory server 101. The compute servers 110 may be conventional servers including CPUs 111 and memory 114, shown as DIMM (dual in-line memory module). The memory 114 is referred to as local memory, as opposed to remote memory on the memory server 101. The local memory 114, for example, is main memory for the compute server. According to an embodiment, the compute servers 110 have less local memory than conventional servers, because the compute servers 110 utilize the memory in the memory server 101. In one embodiment, the physical address space of a CPU is an aggregation of the local memory 114 and a portion of the memory in the memory server 101. As is known in the art, the physical address space of the CPU is the physical address space that is mapped from a virtual address space by a page table used by an OS hosted by the CPU. However, in the embodiment, the physical address space is not limited to local memory, and instead also includes the allocated remote memory in the memory server 101. Due to the ability to utilize remote memory, which is memory in the memory server 101, the compute servers 110 may have less local memory. For example, conventional servers may include 4 or more DIMMs, but the compute servers 110 may function with 1 DIMM, realizing a cost and space savings. Power savings over conventional servers may also be achieved through utilization of the remote memory, which is described in further detail below.

The compute servers 110 also include a local memory controller 113, a system bus 112 connecting the CPUs 111 to other components, a local switch 115 and an I/O switch 116. The local memory controller 113 handles requests from the CPUs 111 for memory access. The functions of the local memory controller 113 are described in further detail below. The local switch 115 receives remote memory access requests from the local memory controller 113 and manages those requests, which may include put or get operations. The local switch 115 also provides an interface between the compute server and the memory server 101 via the connection 120. If the connection 120 comprises PCIe traces, then the local switch 115 may be a PCIe bridge with added functionality for managing remote memory requests. The I/O switch 116 is an interface for connecting I/O devices, such as hard drives (e.g., serial attached SCSI (SAS)), graphics controllers, management processors, such as iLO, etc.

The memory server 101 includes a remote switch 103 and a remote memory controller 104. The remote switch 103 and remote memory controller 104 are labeled as remote, because from the point of view of the compute servers 110, they are remote devices. The remote switch 103 and the remote memory controller 104 may be collocated. The remote switch 103 may be a PCIe bridge that operates as an interface for the memory server 101. The memory server 101 also includes a memory pool which may be comprised of multiple groups of DIMMs 105. Optionally, groups of flash chips 107, serving as backup storage, can be provided in the memory server 101.

The remote switch 103 receives page read and write (get and put) requests from the local switch of each of the compute servers 110. Each request includes a server ID, a physical address, and a request type (read/write) and the actual data (if the request is a write). The remote memory controller 104 then uses the server ID and page address to lookup in a remote page table 106 to determine the ID of the actual DIMM that will store the page. The remote memory controller 104 sends memory control commands, such as wakeup and page open, along with the data to the DIMM. For power savings, the DIMM may be in a nap mode, such as DDR2's (double-date rate 2 RAM) active power down mode, so it will take a few cycles to wakeup. Then, data is read out from the DIMM, for example, in cache block granularity, and sent back to the remote memory controller 104. The data is transferred via the remote switch 103 and connection 120 back to the requesting compute server.

To optimize performance, the remote memory controller 104 can transfer cache blocks back starting from the critical block (the block that caused the remote access), while the requesting compute server restarts computation as soon as the critical block arrives. This optimization is referred to as Critical-Block-First (CBF).

To reduce cost, flash memory 107 is mixed with DRAM (e.g., the DIMM modules 105) together on the memory server 101, and both may be accessed in page granularity. In this case, the memory server 101 stores the pages owned by active compute servers into DRAM, and uses flash memory 106 to store pages owned by idle compute servers. Because the memory server 101 is configured to satisfy the typical, common-case memory requirements of all compute servers, flash memory 106 may be accessed and written extremely infrequently when all compute servers simultaneously use their entire memory resources. Consequently, the reliability and performance impact of accessing flash memory 106 is minimal.

According to embodiments, there are two mechanisms for implementing the pool of memory in the memory server as remote memory for the compute servers. In one embodiment, the mechanism comprises minimal adjustments to firmware on the compute servers, and optimizations may be implemented to reduce latency for remote memory access. This embodiment will now be described along with the configuring process for configuring remote memory as memory for the address space of the CPUs 111 in the compute servers 110.

In this embodiment, remote memory and local memory are aggregated as a single physical address space from the point of view of the CPUs 111 by controlling a firmware setting. As is known conventionally, an OS manages a page table that maps virtual memory to physical memory. Conventionally, the physical memory is only the main memory in the server, such as the local memory 114. In this embodiment, the physical memory space is the aggregation of remote memory on the memory server 101 and the local memory 114. This aggregation makes up the physical address space of the CPUs 111. Thus, the OS maps virtual addresses to physical addresses, where some of the physical addresses point to remote memory. Also, in this embodiment, the fact that some of the physical addresses point to remote memory is made transparent to the CPUs 111 using the firmware setting and the local memory controller 113. By transparency, the CPUs 111 send requests to access physical addresses pointing to remote memory as if the physical addresses pointed to local memory. The CPU and OS do not know which addresses are local and which are remote. In other embodiments, the OS is aware of which addresses are local and which are remote enabling the OS to make intelligent decisions for data placement.

One example of the firmware setting is a register 117 that includes data identifying certain physical addresses as addresses in a local memory and physical addresses in remote memory. The register 117 may be configured through the BIOS to identify a set of physical addresses as being in a remote device, which is the memory server 101 in this case, and that the local switch 115 is then used for remote access to the memory server 101. The local memory controller 113 accesses this register to determine where to send a memory access request from the CPU. One example of the register 117 is the MTRR register for AMD processors. The register 117 may reside in persistent storage accessible during boot up.

Note that when a CPU requests data from remote memory, a remote memory access through the local memory controller 113 and the local switch 115 is performed to retrieve the data from the memory server 101. When the data is transferred to the compute server from the memory server 101, the local memory controller 113 puts the data in local memory 114 for access by the CPU. The local memory controller 113 notifies the OS of the memory location in the local memory 114, so the page table for the OS can be updated to reflect the new physical memory location of the retrieved data. A page eviction (based on e.g., random replacement algorithm) may need to be performed to provide space in the local memory 114 for the retrieved data. Also, when a remote memory request is needed due to a miss in local memory 114, a local cache or buffer potentially residing in the local switch 115 may be checked for the requested data before performing the remote memory access if caching is being performed.

Figure 2:
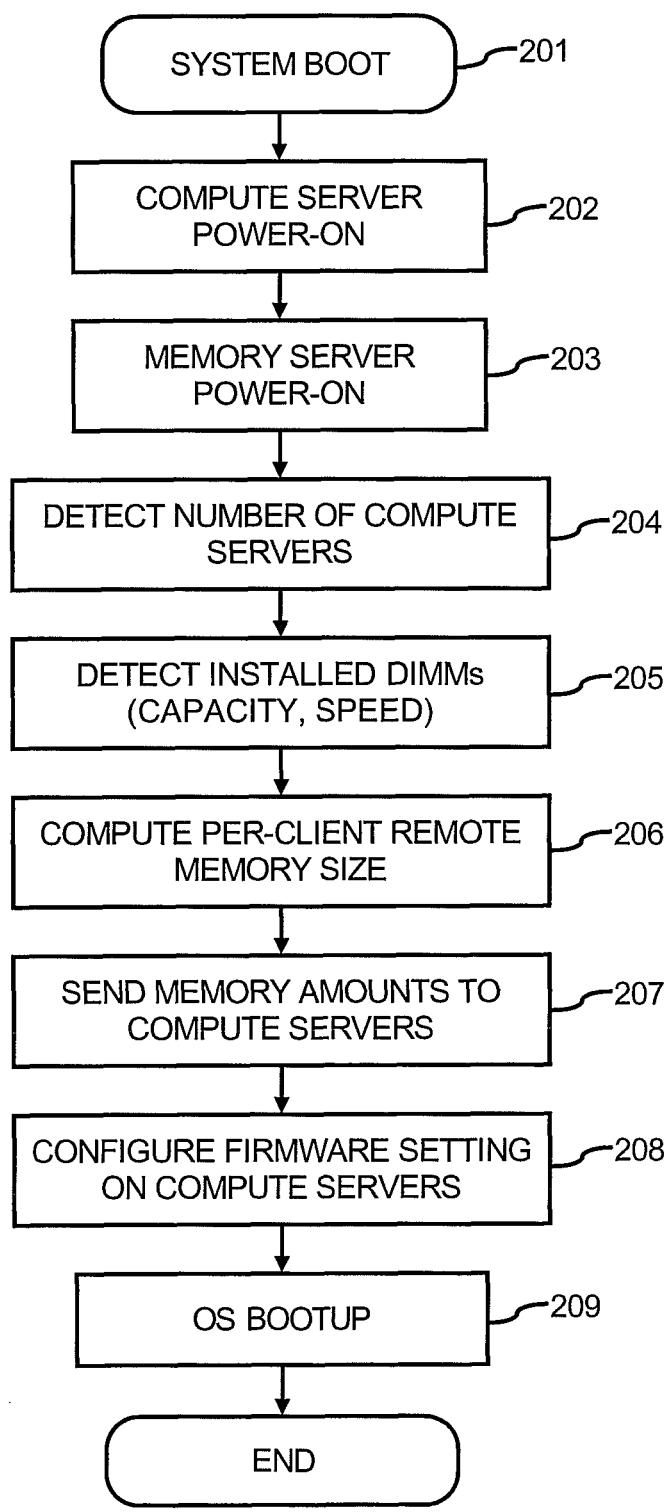
FIG. 2 illustrates a method, according to an embodiment.

A configuration process is shown in FIG. 2, according to an embodiment. The configuration process is described by way of example for configuring the system 100, and in particular configuring the compute servers 110 and the memory server 101 for memory aggregation with local and remote memory.

At steps 201-203, the system 100 is powered on. This includes compute servers 111 and the memory server 101 powered on at steps 202 and 203.

The amount of remote memory available to each compute server is determined by at least two factors: (1) the number of compute servers that share the memory blade, and (2) the amount of total memory (including DRAM and Flash) installed on the memory server. At step 204, the memory server 101 detects the number of compute servers actively connected to it, as well as the amount of memory installed in the memory server 101 at step 205.

At step 206, the memory server 101 computes each compute server's remote memory size, for example, by evenly distributing the memory among the compute servers or according to some other policies.

At step 207, the memory server 101 sends the memory amounts to the compute servers 110. This is the amount of remote memory initially allocated to each compute server. This may including sending an indication of the memory amount to each compute server.

At step 208, the firmware setting is configured based on the amount of allocated remote memory. For example, the firmware setting is configured to include a physical memory address range corresponding to the amount of allocated remote memory, and the registers 116 are updated accordingly.

At step 209, the OS is booted up on each compute server, and the OS page table includes a map to remote memory. For example, the OS on each compute server reads the register 117, which may be a BIOS register, on boot up. The total physical memory size recognized by the OS equals to the sum of locally installed DRAM, such as local memory 114, and the size of the allocated remote memory. The OS sets up its page table, so physical addresses beyond local memory range but within the total memory range are memory-mapped I/O but still cacheable. These pages are memory-mapped as I/O so that the local switch 115 will be responsible for servicing requests to them, while still cacheable to reduce the number of long-latency memory-mapped I/O operations.

Different policies may be used to determine the allocation of memory to the compute servers. Also, one policy may be implemented for initial allocation, such as equal allocation of memory among active compute servers. However, due to various factors, memory may be re-allocated according to a different policy. For example, compute servers that are more active may be allocated more memory.

In the second mechanism for implementing the pool of memory in the memory server as remote memory for the compute servers, the OS knows which physical memory addresses are for remote memory. The OS is thus able to make intelligent decisions on what data to store locally versus remotely. For example, data likely to be needed more often or within a number of cycles will be stored locally.

In this embodiment for the second mechanism, the local memory and the remote memory are configured as 2-level memory from the point of view of the OS. The first level of memory is the local memory 114, and is used to store frequently accessed pages. The second level of memory is remote memory in the memory server 101, and is used to store pages evicted from the local memory 114. CPU/OS memory requests are always satisfied by the local memory 114. A miss in the local memory 114 causes a remote page to be migrated into the local memory 114 and consequently replaces a local page with the page from the remote memory. Various replacement policies can be used to choose the victim page. Random replacement is simple and can provide comparable performance when compared to more advanced replacement policies such as LRU (Least-Recent-Used).

In this embodiment, the kernel may be modified or an agent or thread is used to identify and access remote memory. In another embodiment, the OS accesses the remote memory as if the remote memory is an I/O device, like a disk. Also, note that the configuration process described above with respect to FIG. 2 may be used for the second mechanism also to allocate remote memory to the compute servers. However, there may be no configuration of a firmware setting.

As described above, one optimization to improve latency for remote memory accesses is CBF, which does not require custom changes in the CPU and memory chips. For CBF, the local switch 115 includes a page buffer table, which stores a finite number of migrating pages that are in transit from the memory server 101 to the compute server. Each entry in the table contains (1) the page's base physical address, (2) a block presence bit-vector that keeps track of what cache blocks in this page have arrived, and (3) the page content.

As described with respect to FIG. 2, the local memory controller 113 is configured to route remote memory references as memory mapped I/O accesses to the local switch 115. The local switch 115 extracts the requested page's base address and looks it up in its page buffer table. If it misses, then a request will be sent to the memory server 101 which triggers CBF data transfers into the page buffer table. If it hits in the page buffer table of the local switch 115, a response message will be sent back to the CPU whenever the requested block has arrived (such information is recorded in a block presence bit-vector). When the entire page has arrived, the local switch 115 can trap into the OS to (1) select a victim page for replacement and trigger the page transfer to the memory server 101, (2) refill the replaced page frame with the requested page that has just arrived, and (3) update the CPU's memory management unit (MMU, often implemented as a TLB) to reflect such changes. Subsequent requests to the newly installed page will then be serviced locally.

If the remote memory is rarely accessed, it may be suitable to perform error detection scans (such as memory scrubbing) without requiring a high-speed hardware implementation which often adds to DRAM costs. Because the memory resources on the memory server 101 are often under-utilized, the data on a faulty DIMM can be migrated to another DIMM without requiring a reboot or system crash. When such faults accumulate to reach a specified threshold, a warning message is sent to the system administrator, who decides when to shutdown the servers and replace the faulty DIMMs, which may be marked by an LED indicator.

Because various compute servers can have heterogeneous workloads and varying utilization levels, it may be rare that all compute servers simultaneously use all their allocated remote memory. To exploit this property, the memory on the memory server 101 can be over-committed to reduce costs, while the remaining capacity is backed-up by flash memory, which is ¼ the cost and non-volatile. The memory server 101 puts pages for under-utilized compute servers into flash and keeps pages from active, highly-utilized compute servers in DRAM.

The memory server 101 allows for capacity and power optimizations. One such optimization is memory compression that can be performed without modifying the compute servers 110. The remote memory controller 104 compresses page content on-the-fly as pages are evicted from compute servers 110, and stores multiple compressed pages into one physical page. The space saved by memory compression can potentially be used to enhance memory reliability by replicating a memory pages in multiple DIMM modules. In order to support such optimizations, the page table 106 doubles the number of page entries.

As pages are evicted from a compute server's local memory 114 into the memory server 101, the remote memory controller 104 in the memory server 101 can compute a page signature (often implemented as a hash function of the page content) while the page is being transferred. This signature can be stored in the remote page table 106, and compared with newly arrived pages as a background task. If two signatures match, it is then very likely that the two pages have identical content. Another comparison may then be used to confirm identical content, such as a word-by-word comparison. One copy is stored in memory for identical pages, greatly freeing up memory resources. An entry may be created in the remote page table 106 for each copy, but pointing to the same memory location on the memory server 101.

The memory server architecture reduces power consumption in two ways: by reducing the total amount of DRAM drawing power, and by enabling the extended use of lower-power DRAM components and modes on the shared memory servers. Accesses to the memory servers may be less frequent, at page granularity, and their latency is dominated by transfer time across the connection 120. As a result, the memory modules 105 can be left in active power-down mode as a matter of course, which reduces power by more than 90% in DDR2, paying a relatively minor latency penalty (6 DRAM cycles) to wake the necessary devices and banks once on each access to fetch an entire page worth of data. Similarly the remote memory controller 104 can stay in nap mode between requests to save power, with a negligible latency penalty for wake up.

If a compute server only accesses the memory server 101 when there is a miss in its local memory 114, which is much less frequent compared to normal memory accesses, one client-side PCIe switch can be shared between multiple compute servers. For example, the local switch 115 may be external to the computer server and shared by multiple compute servers. Consequently each PCIe x4 communication channel will be used to transfer pages between the memory server 101 and multiple compute servers, which increases the ratio between compute servers versus memory servers and reduces backplane area requirements.

One or more of the steps of the methods described herein and other steps described herein may be implemented as software embedded on a computer readable medium, such as the memory and/or data storage, and executed on a computer system, for example, by a processor. The steps may be embodied by one or more computer programs, which may exist in a variety of forms both active and inactive. For example, they may exist as software program(s) comprised of program instructions in source code, object code, executable code or other formats for performing some of the steps.

Any of the above may be embodied on a computer readable medium, which include storage devices. Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes.

While the embodiments have been described with reference to examples, those skilled in the art will be able to make various modifications to the described embodiments without departing from the scope of the claimed embodiments.

What is claimed is:

1. A system comprising:
a plurality of servers, each including at least one central processing unit (CPU) and local memory;
a memory server remotely located from the plurality of servers and including a pool of remote memory shared by the plurality of servers across a connection, wherein each of the plurality of servers are independent from each other and the memory server;
a remote memory controller, wherein the remote memory controller is to determine an amount of the remote memory from the pool of the remote memory to allocate to each server of the plurality of servers based on a total number of the plurality of servers and a total amount of the remote memory in the pool, and the remote memory controller is to allocate for each of the plurality of servers the determined amount of the remote memory, wherein a physical address space for an operating system (OS) running on each of the plurality of servers includes an aggregation of its allocated remote memory and its local memory, each OS running on each of the plurality of servers is configured to identify which physical addresses correspond to the remote memory in the memory server, and each OS is configured to make decisions on whether to store data in the local or the remote memory based on at least one factor including latency for remote memory accesses, wherein the sharing of the remote memory in the pool is at least governed by address translation at the remote memory controller and is transparent to the OSs; and
a local switch for each of the servers providing an interface to the remote memory via the connection, wherein the local switch is configured to implement a critical block first (CBF) policy, wherein critical blocks for a remote memory request are provided to a CPU as retrieved while other pages for the request are still being retrieved.

2. The system of claim 1, wherein a block presence vector is updated to indicate which blocks have arrived and are operable to be used by the CPU, and the arrived blocks are cacheable in a processor cache.

* * * * *